(12) United States Patent
Furuta et al.

(10) Patent No.: US 6,959,776 B2
(45) Date of Patent: Nov. 1, 2005

(54) BIPEDAL HUMANOID

(75) Inventors: Takayuki Furuta, Tokyo (JP); Yu Okumura, Kanagawa (JP); Tetsuo Tawara, Tokyo (JP); Hiroaki Kitano, Saitama (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 10/490,483

(22) PCT Filed: Sep. 19, 2002

(86) PCT No.: PCT/JP02/09622

§ 371 (c)(1),
(2), (4) Date: Mar. 23, 2004

(87) PCT Pub. No.: WO03/028959

PCT Pub. Date: Apr. 10, 2003

(65) Prior Publication Data

US 2004/0211603 A1 Oct. 28, 2004

(30) Foreign Application Priority Data

Sep. 26, 2001 (JP) .................................. 2001-293881

(51) Int. Cl.$^7$ ................................. B62J 5/00
(52) U.S. Cl. ........................................ 180/8.1
(58) Field of Search .................. 180/8.1, 8.6; 901/1

(56) References Cited

U.S. PATENT DOCUMENTS

| | | | | | |
|---|---|---|---|---|---|
| 6,564,888 | B1 | * | 5/2003 | Gomi et al. ................ | 180/8.6 |
| 6,832,132 | B2 | * | 12/2004 | Ishida et al. ............... | 700/245 |
| 2004/0050595 | A1 | * | 3/2004 | Saito et al. ................. | 180/8.1 |
| 2004/0074679 | A1 | * | 4/2004 | Miyazaki et al. ........... | 180/8.1 |

FOREIGN PATENT DOCUMENTS

| | | |
|---|---|---|
| EP | 1084943 | 3/2001 |
| JP | 2001-179663 | 7/2001 |
| JP | 2002-227829 | 8/2002 |

* cited by examiner

Primary Examiner—Kevin Hurley
(74) Attorney, Agent, or Firm—Westerman Hattori Daniels & Adrian, LLP (57) ABSTRACT

The present invention provides a biped (two-footed) walking humanoid robot easily capable of such full body movement as, for example, protective action when tumbling down, arising action and rolling action. The body part (11) is configured with a waist part (11b) below, a breast part (11a) attached biaxially movably to said waist part, and a drive means (11d, 11e) to move said breast part biaxially, and a controller (50) makes full body movement performed by drive controlling each drive means in mutual coordination. A walk controller (50) drive controls each drive means in mutual coordination, whereby moving the breast part (11a) biaxially with respect to the waist part (11b), namely moving longitudinally or rotating horizontally, and thus makes it possible to move totally the upper part configured with the breast part and arm parts with respect to the lower part configured with the waist part (11b) and leg parts (12) by so-called stoop forward and twisting of a waist. Therefore, protective action when tumbling down, arising action, and rolling action are made possible. Also in case that full body movement is to be performed with the walk controller driving arm parts (13) and the breast part (11a) and utilizing the weight and the moment of inertia of these arm and a breast parts, a walk controller not only drives each part by each drive means, but also moves or rotates arm and a breast parts with respect to the waist part (11b), utilizes the weight and the moment of inertia of arm and a breast part with respect to the waist part, and thus makes it possible, for example, to jump. Further, balancing motion can be performed by utilizing such weight and moment of inertia of arm and breast parts, and by conducting three dimensional compensation of the motion utilizing the upper body.

11 Claims, 12 Drawing Sheets

BIPEDAL HUMANOID

TECHNICAL FIELD

The present invention relates to a biped (two-footed) walking humanoid robot, and more specifically a biped walking humanoid robot capable of such full body movement, for example, as protecting action when tumbling down, arising action from lying posture following tumbling, and rolling or jumping.

BACKGROUND ART

A biped walking humanoid robot as it is called in the art has so far been made able to walk with two legs by producing in advance data for a pre-established walking pattern (hereinafter referred to as "gait") and actuating the legs in a controlled manner in accordance with the gait data so that the robot can bipedally walk as desired.

Such a conventional biped walking humanoid robot tends to become unstable in walking position due, for example, to floor surface conditions and an error in the physical parameters of the robot itself and may then even turn over. For this reason, walking stability is maintained by, for example, controlling the robot parameters such as ZMP (Zero Moment Point, the point where the composite moment of floor counterforce on a sole of a robot foot and gravity becomes zero).

However, a biped walking humanoid robot of the prior art is so designed on a premise as to walk in a stand up posture, and though it is designed not to tumble down as far as possible, its body part is to aid control of walking, and is not designed to act in coordination with arms and feet.

Hence a biped walking humanoid robot of the prior art is not so designed for such full body movement to make its body, feet, and arms act as a whole, for example, as protecting action when tumbling down, arising action from lying posture following tumbling, and rolling or jumping. Therefore, freedom of movement or the range of rotation angle of the waist part of a body restricts such full body movement.

Further, if a biped walking humanoid robot tumbles down repeatedly, such parts as a body and the tips of arms and feet may be damaged or become bumpy. waist part of a body restricts such full body movement.

Further, if a biped walking humanoid robot tumbles down repeatedly, such parts as a body and the tips of arms and feet may be damaged or become bumpy. Since there are so many cables for driving or sensor, however, to have much freedom of movement in each part in a prior art, it was difficult to change, for example, arms and feet easily.

DISCLOSURE OF THE INVENTION

It is the object of the present invention, taking into consideration the above-mentioned problems, to provide a biped walking humanoid robot easily capable of such full body movement, for example, as protecting action when tumbling down, arising action, and rolling.

In order to attain the object mentioned above, there is provided in accordance with the present invention, a biped walking humanoid robot which comprises: a body part, a pair of leg parts attached to the lower both sides of said body part, a pair of arm parts attached to the upper both sides of said body part, and a head part attached on top of said body part, wherein said leg parts include a pair of thigh parts attached triaxially movably to said body part, a pair of lower thigh parts each of which attached monoaxially movably to each lower end of said thigh parts, and a pair of foot parts each of which attached biaxially movably to each lower end of said lower thigh parts, wherein said arm parts include a pair of upper arm parts one end of which attached biaxially movably to said body part, a pair of lower arm parts each of which attached monoaxially movably to each other end of said upper arm parts, and a pair of hand parts each of which attached monoaxially movably to each of said lower arm parts, and wherein the robot further comprises a drive means for moving foot parts, lower thigh parts, and thigh parts of said leg parts, hand parts, lower arm parts, and upper arm parts of said arm parts, and a breast part, respectively, and a walk controller which drive controls each drive means, the robot being characterized in that: said body part comprises a waist part below, said breast part above attached biaxially movably to said waist part via a connection mechanism, and a drive means to move biaxially said breast part, said connection mechanism is attached to said breast part, and comprises a breast frame provided with a rotatory part acting as a vertical rotation axis at the bottom end, a waist frame attached to said waist part, and a moving part connecting mutually said breast frame and said waist frame, said moving part is provided with the plurality of balls held by ring units at equi-angular interval along the guideway formed as circular at the upper surface, said ring units support said breast frame in the direction of radial and thrust by receiving into its inner diameter part said rotatory part attached to the bottom surface of said breast frame, said waist frame is provided with a horizontal rotation axis aligned at the forward position from the center, and said moving part is supported movably with respect to said horizontal rotation axis.

A biped walking humanoid robot in accordance with the present invention preferably makes full body movement with said walk controller driving said arm and breast parts thereby utilizing the weight and the moment of inertia of these arm and breast parts.

Also a biped walking humanoid robot in accordance with the present invention preferably has said rotatory part attached detachably to the output axis of drive means set on the moving part.

A biped walking humanoid robot in accordance with the present invention preferably has said breast part rotatable horizontally in the angle range of −45 to +45 degrees or more.

A biped walking humanoid robot in accordance with the present invention preferably has said breast part bendable forward longitudinally in the angle range of −10 to +60 degrees or more, said thigh parts movable longitudinally in the angle range of −45 to +60 degrees or more with respect to said waist part, and said lower thigh parts movable longitudinally in the angle range of −120 to 0 degrees or more with respect to said thigh parts.

A biped walking humanoid robot in accordance with the present invention preferably has a sensor being set on the waist part of said body is preferably such that in which power source batteries are set in front of said breast part to supply electricity to said each drive means and a walk controller.

In the basic makeup of the invention as described above, for full body movement of a biped walking humanoid robot, the upper body comprising arm and breast parts can be moved totally with respect to the lower body comprising waist and foot parts by so called stooping and twisting of waist with the breast part rotating biaxially, namely moving longitudinally or rotating horizontally with respect to the waist part, by the walk controller drive-controlling each drive means mutually coordinated. It becomes therefore possible to assure such full body movement as, for example, protective action when tumbling, arising action and rolling action.

Said walk controller can, in case of making full body movement by utilizing the weight and the moment of inertia of these arm and breast parts by driving them, even make broader full body movement like, for example, jumping by utilizing the weight and the moment of inertia of these arm and breast parts to the waist part by, not only driving each part with each drive means, but also moving or rotating the arm and breast parts with respect to the waist part.

Moreover, balancing motion is also possible by three dimensional compensation of movement using the upper body utilizing such weight and the moment of inertia of these arm and breast parts.

In case that a rotation axis supporting said breast part which is supported pivotally movably with respect to the moving part supported movably in the longitudinal direction of the waist part, said breast part moves longitudinally, and also at the same time rotates horizontally with the rotation axis supporting the breast part rotating with respect to the moving part, and with the moving part moving longitudinally with respect to the waist part.

In case that the vertical rotation axis supporting said breast part is constructed with a flat rotatory part made integrally with a breast part, and said rotatory part is supported in the direction of radial and thrust with the plurality of balls held equi-angularly with ring units guided along a circular guideway set on said moving part, a breast part is supported in the direction of radial and thrust with sufficient rigidity with respect to a waist part, as well as longitudinally movably and horizontally rotatably, since supported rotatably through the plurality of balls with respect to a moving part and a waist part. Also in case that said rotatory part is attached detachably to the output axis of drive means set on a moving part, a breast part is easily separable from a moving part and a waist part.

In case that the horizontal rotation axis supporting said breast part movably in the longitudinal direction is aligned in forward position from the center, or the horizontal rotation axis supporting said moving part movably in the longitudinal direction is aligned in forward position, then said breast part can stoop forward in the deep angle, since movable longitudinally around the horizontal rotation axis aligned in forward position, and the whole body can be constructed in a compact size.

In case that said breast part is rotatable horizontally in the angle range of −45 to +45 degrees or more, it becomes possible to assure rolling action by rotating the breast part within said angle range with respect to the waist part together with the rotating motion of the foot parts with respect to the waist part.

In case that said breast part is bendable forward longitudinally in the angle range of −10 to +60 degrees or more, said thigh parts movable longitudinally in the angle range of −45 to +60 degrees or more with respect to the waist part, and said lower thigh parts movable longitudinally in the angle range of −120 to 0 degrees or more with respect to the thigh parts, it becomes possible to assure rising up motion within said motion range for protective action when tumbling down, and arising action from lying posture following tumbling of a biped walking humanoid robot.

In case that a sensor is set on a waist part to detect said robot parameters where the error or vibration caused by each drive means is relatively less than on a breast part, the robot parameters, for example, triaxial orientation and acceleration can be accurately detected without being affected by walking action of the robot, and being interfered by motion of the upper body. Thus, compensation of walking action becomes possible by utilizing motion of the upper body, for example, action of swinging both arms alternately forward and backward and the like.

In case that said sensor is constituted with a gyrosensor or a triaxial acceleration sensor, or a gyrosensor and a triaxial acceleration sensor, triaxial orientation of a body part of a robot can be detected by a gyrosensor, and triaxial acceleration of a body part of a robot can be detected by a triaxial acceleration sensor, both as robot parameters.

In case that said sensor is constituted as a module together with circuit parts of microprocessors and others for measurement and signal processing of said sensor, and contained in said waist part, wiring of cables from said module to walk controller can be simplified, for detection signals from the sensor are processed in said module, and amplified to the signal level suitable, for example, to transmission.

In case that the power source batteries are set in front of the breast part to supply electricity to said each drive means and a walk controller, the batteries do not hinder full body movement of a robot, though keeping the center of gravity of the robot high. If a robot tumbles down forward, it can reduce the shock to batteries by extending its arms forward, and if it tumbles down backward, its arising motion is not hindered by the weight of power source batteries.

BRIEF DESCRIPTION OF THE DRAWINGS

The present invention will better be understood from the following detailed description and the drawings attached hereto showing certain illustrative forms of embodiment of the present invention. In this connection, it should be noted that such forms of embodiment illustrated in the accompanying drawings hereof are intended in no way to limit the present invention but to facilitate an explanation and an understanding thereof, in which drawings.

BEST MODES FOR CARRYING OUT THE INVENTION

Hereinafter, the present invention will be described in detail with reference to suitable forms of embodiment thereof illustrated in the figures.

Figure 1:
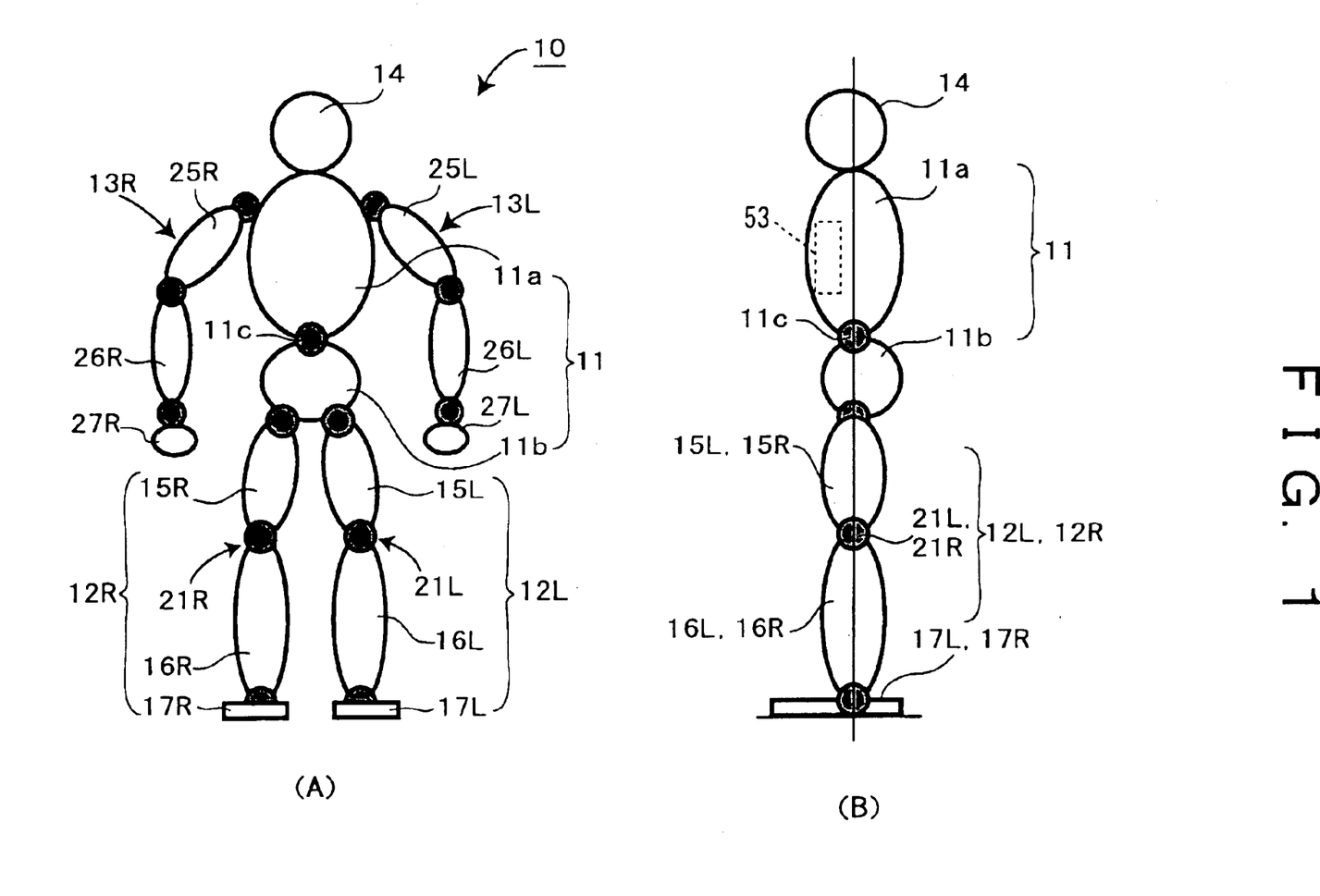
FIG. 1 is an outside appearance of a biped walking humanoid robot of the first embodiment of the present invention; in which (A) is a schematic front view, and (B) is a schematic side view.
Figure 2:
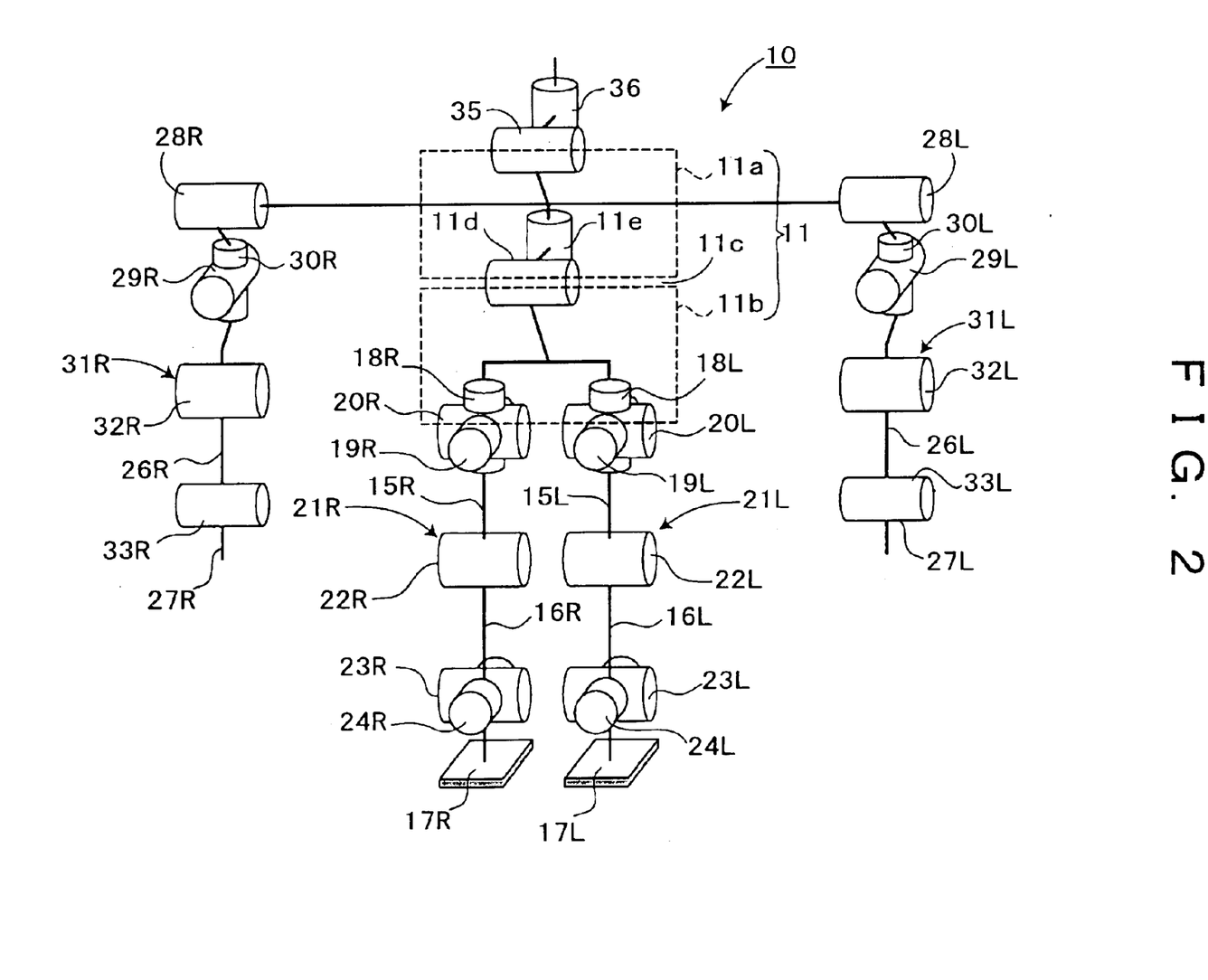
FIG. 2 is a schematic view illustrating the mechanical makeup of the biped walking humanoid robot of FIG. 1.

FIG. 1 and FIG. 2 show the makeup of an embodiment of a biped walking humanoid robot in accordance with the present invention. Referring to FIG. 1, a biped walking humanoid robot 10 includes a body part 11, leg parts 12L and 12R attached to the lower both sides of the body part 11, arm parts 13L and 13R attached to the upper both sides of the body part 11, and a head part 14 attached on top of the body part.

The body part 11 is separated to an upper breast part 11a and a lower waist part 11b, wherein the breast part 11a is supported by a forward bending part 11c longitudinally movably relative to a waist part 11, especially forward bendably, and horizontally rotatably. Further, the breast part 11a of the body part 11 contains inside a walk controller 50 to be mentioned later. The forward bending part 11c has a joint part 11d for longitudinal movement and a joint part 11e for horizontal rotation, and each of joint parts 11d and 11e is configured with a joint driving motor, respectively (See FIG. 2.).

Leg parts 12L and 12R are configured with thigh parts 15L and 15R, lower thigh parts 16L and 16R, and foot parts 17L and 17R, respectively. Here, said leg parts 12L and 12R are provided, as is shown in FIG. 2, each with six joint parts, namely sequentially from the top, joint parts 18L and 18R for the leg part rotation relative to the waist part 11b of the body part 11, joint parts 19L and 19R for the rolling direction (around x axis) of leg parts, joint parts 20L and 20R for the pitch direction (around y axis) of leg parts, joint parts 22L and 22R in the pitch direction of knee parts 21L and 21R connecting thigh parts 15L and 15R and lower thigh parts 16L and 16R, joint parts 23L and 23R in the pitch direction of ankle parts of foot parts 17L and 17R, and joint parts 24L and 24R in the rolling direction of ankle parts. To wit, each of joint parts 18L and 18R through 24L and 24R is configured with a joint drive motor, respectively.

Thus, a waist joint is configured with joint parts 11d and 11e, a hip joint is configured with joint parts 18L, 18R, 19L, 19R, 20L, and 20R, and foot joints are configured with joint parts 23L, 23R, 24L, and 24R, whereby leg parts 12L and 12R of the both sides of the biped walking humanoid robot 10 are provided with six freedoms respectively, and walking at will in the three dimensional space is made possible by giving actions as desired to all of leg parts 12L and 12R by drive controlling these twelve joint parts to appropriate angles, respectively, by the drive motor for various motions.

Arm parts 13L and 13R are configured with upper arm parts 25L and 25R, lower arm parts 26L and 26R, and hand parts 27L and 27R respectively. Here, Said upper arm parts 25L and 25R, lower arm parts 26L and 26R, and hand parts 27L and 27R of said arm parts 13L and 13R are provided, like above-mentioned leg parts 12L and 12R as is shown in FIG. 2, each with five joint parts, namely sequentially from the top, joint parts 28L and 28R in the pitch direction of upper arm parts 25L and 25R relative to the body part 11, joint parts 29L and 29R in the rolling direction, joint parts 30L and 30R in the horizontal direction, all at shoulder parts, joint parts 32L and 32R in the pitch direction of the elbow parts 31L and 31R connecting upper arm parts 25L and 25R and lower arm parts 26L and 26R, and joint parts 33L and 33R in the pitch direction of hand parts 27L and 27R relative to lower arm parts 26L and 26R at wrist parts. To wit, each of the joint parts 28L and 28R through 33L and 33R is configured with a joint drive motor, respectively.

Thus, the arm parts 13L and 13R of the both sides of the biped walking humanoid robot 10 are provided with five freedoms respectively, and it is made possible to give any motion as desired to all of arm parts 13L and 13R by drive controlling these ten joint parts to appropriate angles, respectively, by the drive motor for various motions. Here, the rotation axes of joint parts 28L and 28R in the pitch direction at said shoulder parts are aligned in forward position relative to joint parts 29L and 29R in the rolling direction, and joint parts 30L and 30R in the horizontal direction, and the forward angles of swing of arm parts 13L and 13R are designed to be larger.

Said head part 14 is attached on top of the upper part 11a of the body part 11, and is provided with, for example, a camera as visual sense and a microphone as audio sense. Here, said head part 14 is provided, as is shown in FIG. 2, a joint part 35 in the pitch direction of a neck, and a joint part 36 in the horizontal direction. To wit, each of joint parts 35 and 36 is configured with a joint drive motor, respectively.

Thus, the head part 14 of the biped walking humanoid robot 10 is provided with two freedoms, and it is made possible to move the head part 14 in the horizontal or the longitudinal direction by drive controlling these two joint parts 35 and 36 to appropriate angles, respectively, by the drive motor for various motions. Here, the rotation axis of said joint part 35 in the pitch direction is aligned in forward position with respect to the joint part 36 in the horizontal direction, and the forward-moving angle of the head part 14 is designed to be larger.

Figure 3:
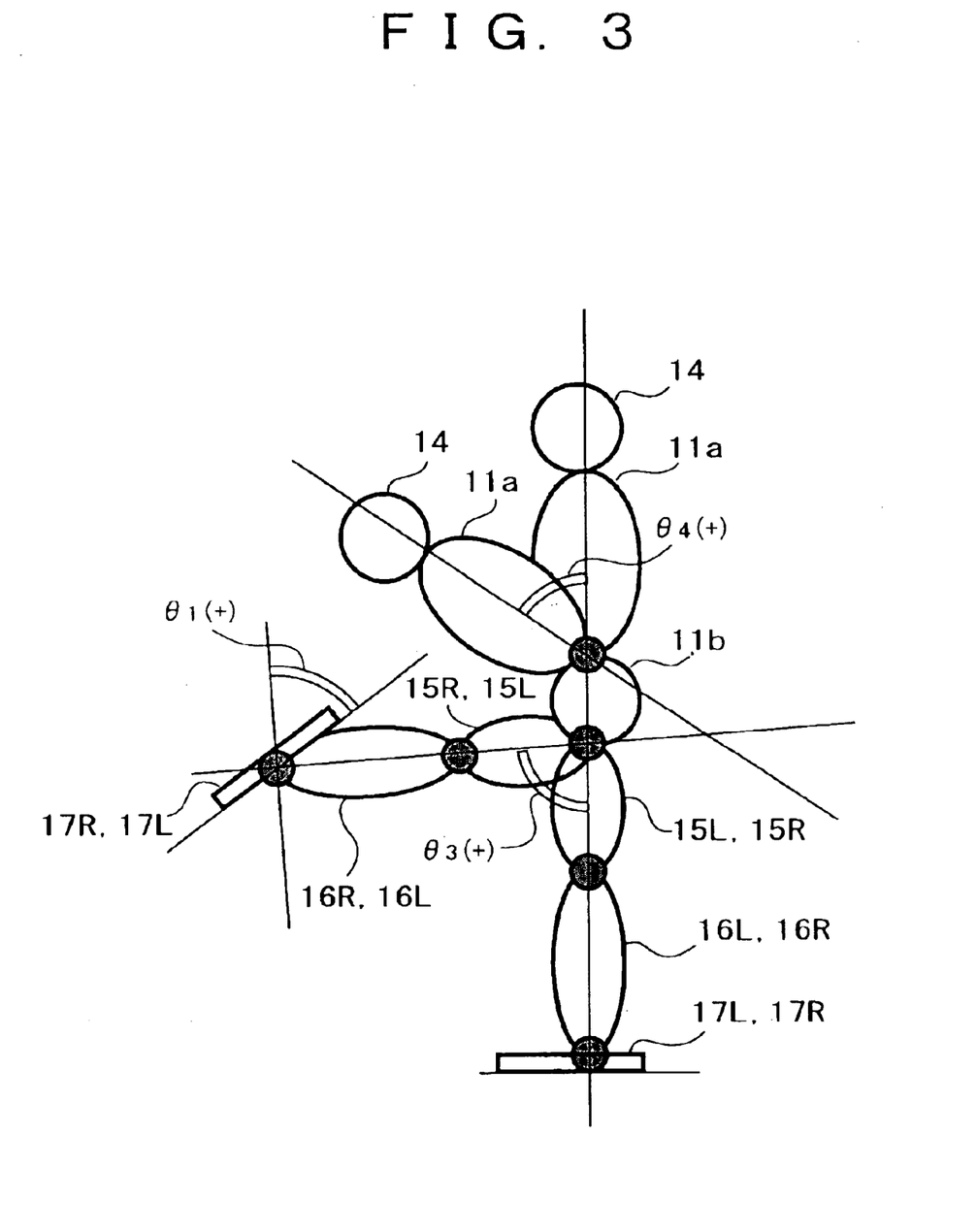
FIG. 3 is a schematic view illustrating the forward moving limit of respective joint parts of a forward bending part and foot parts of the biped walking humanoid robot of FIG. 1.
Figure 4:
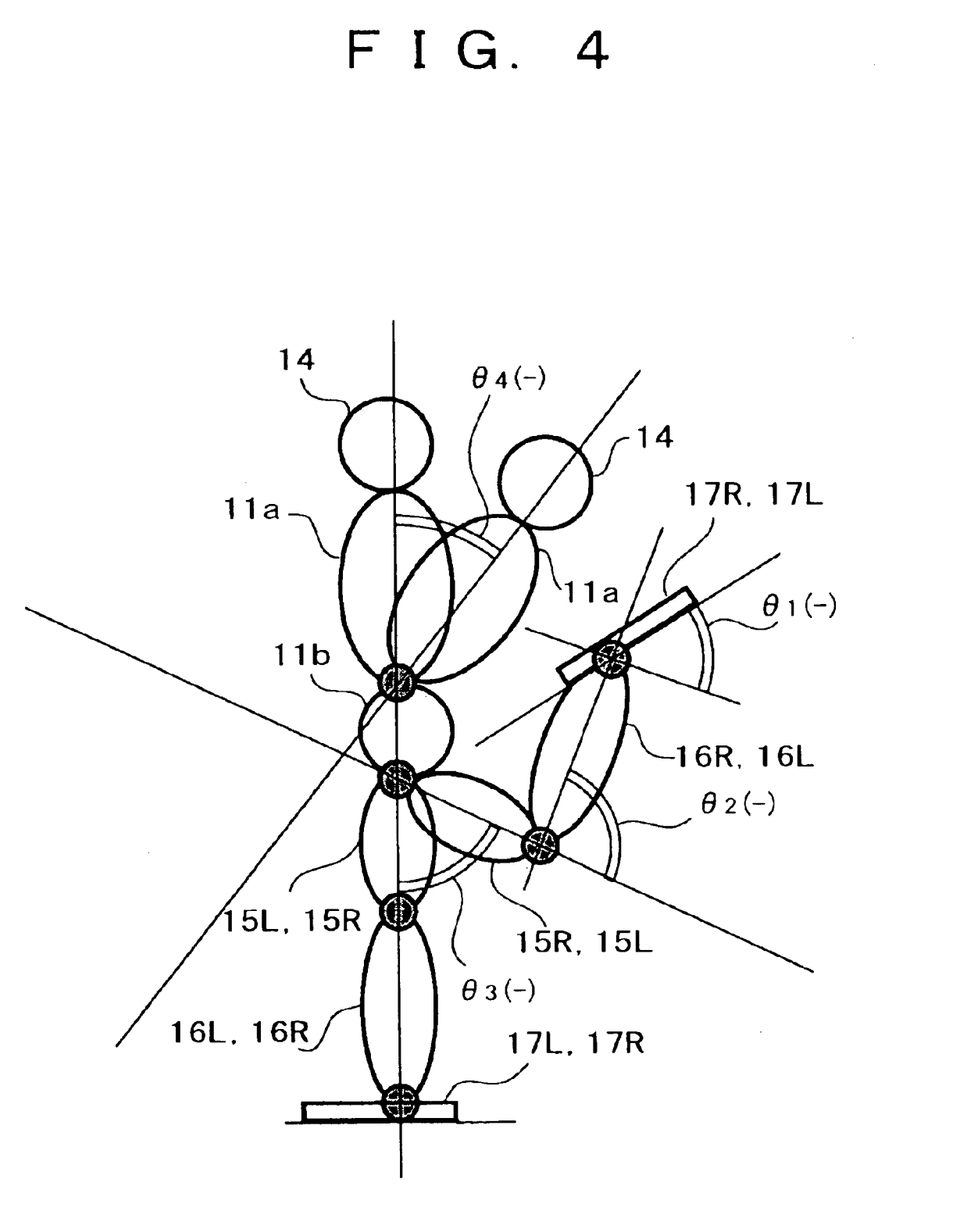
FIG. 4 is a schematic view illustrating the backward moving limit of respective joint parts of a forward bending part and foot parts of the biped walking humanoid robot of FIG. 1.
Figure 5:
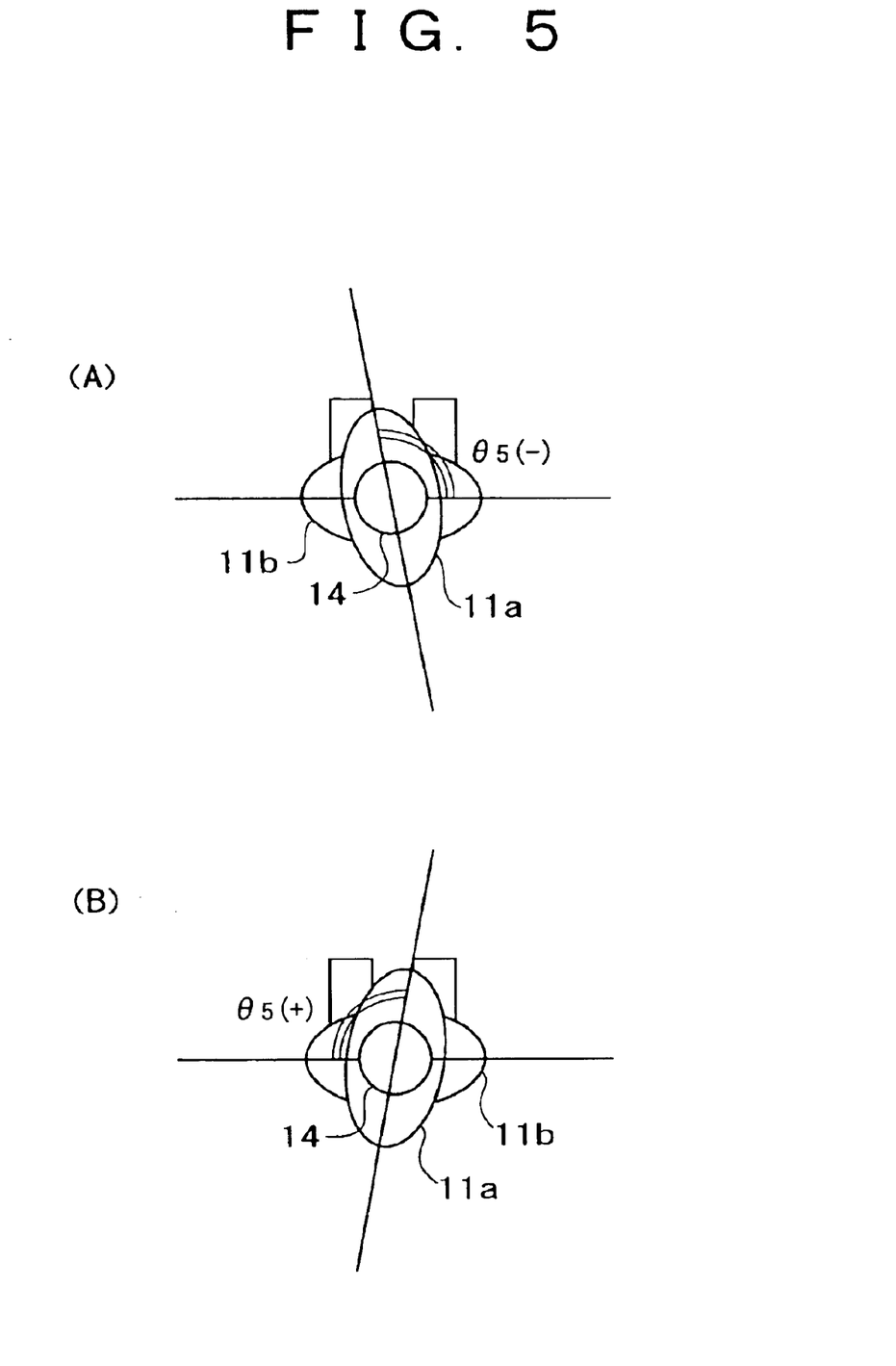
FIG. 5 is a schematic view illustrating respective joint parts of a forward bending part of the biped walking humanoid robot of FIG. 1; in which (A) illustrates the rotation limit to the left, and (B) illustrates the rotation limit to the right.

Further in the biped walking humanoid robot 10, the joint part 11d of the forward bending part 11c of the body part 11, and longitudinal joint parts of leg parts 12L and 12R, namely joint parts 20L and 20R of hip joints, joint parts 22L and 22R of knee parts, and joint parts 23L and 23R of ankle parts are movably supported within the angle range shown in FIG. 3 and FIG. 4. That is, the joint parts 23L and 23R of ankle parts are movable with their moving angles θ1 within the angle range −20 to +20 degrees or more. Also, the joint parts 22L and 22R of knee parts are movable with their moving angles θ2 within the angle range −120 to 0 degrees or more. Further, the joint parts 20L and 20R of the waist joint are movable with their moving angles θ3 within the angle range −45 to +60 degrees or more. Also, the forward bending part 11c of the body part 11 is movable with their moving angles θ4 within the angle range −10 to +60 degrees or more. axis is also used in an elbow parts or a neck part.

Figure 6:
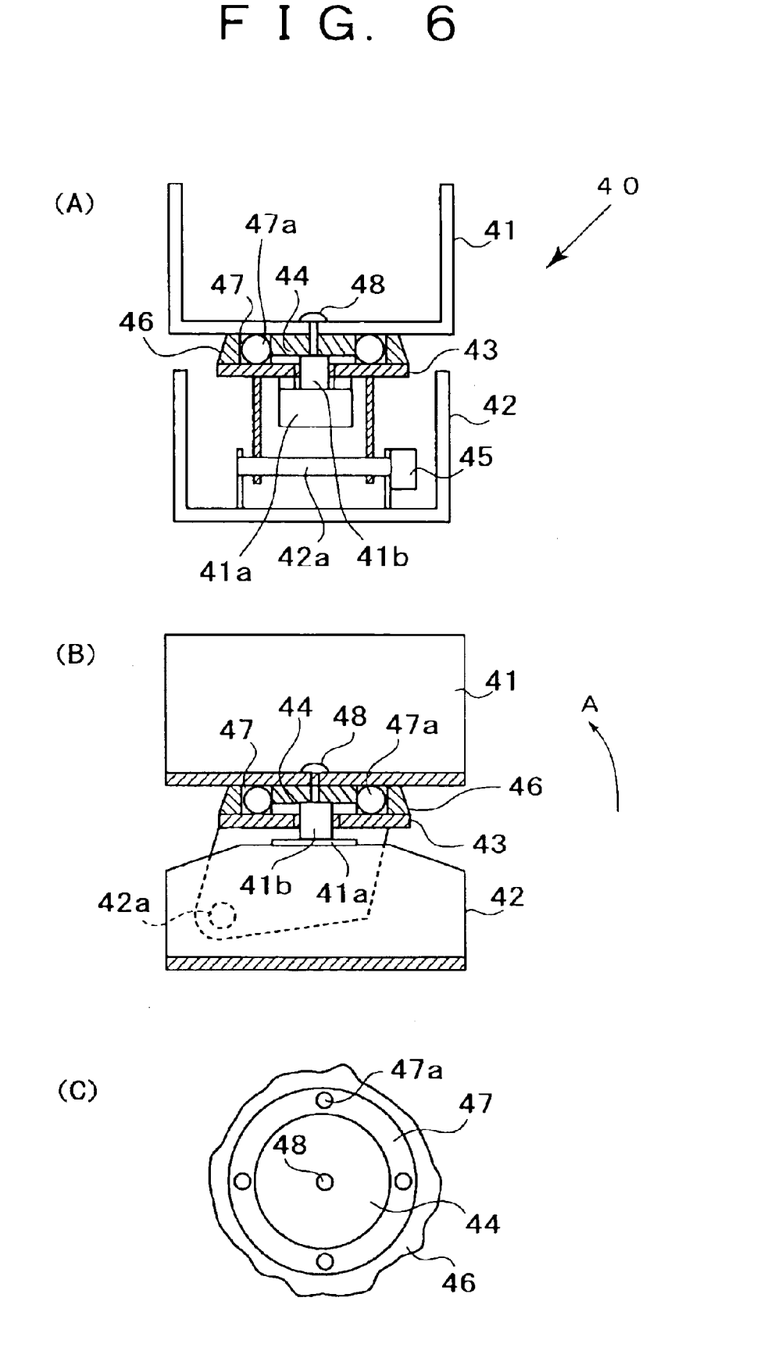
FIG. 6 illustrates the makeup of a joint mechanism between a breast part and a waist part of the body part of the biped walking humanoid robot of FIG. 1; in which (A) is a front view, (B) is a right-side view, and (C) is a cross-sectional view of a waist part.
Figure 7:
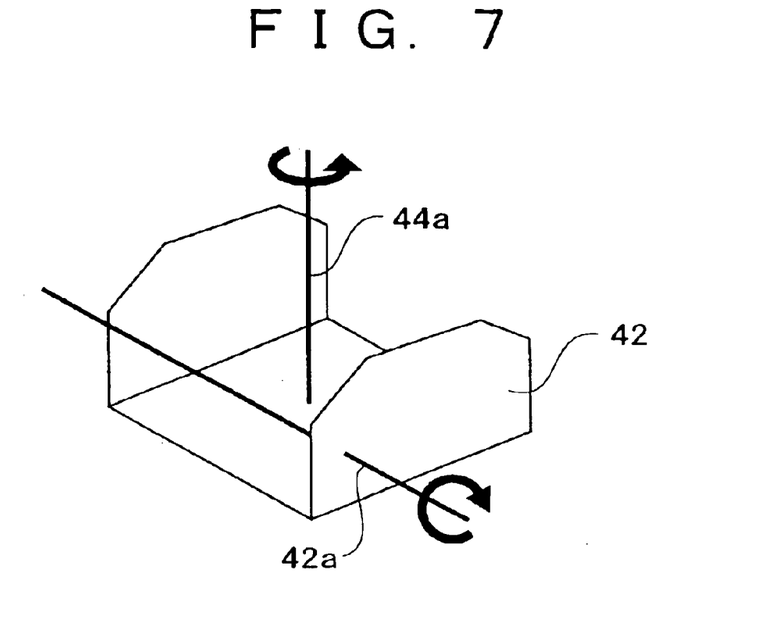
FIG. 7 is a schematic perspective view illustrating the relative positions of the vertical and the horizontal rotation axes in the joint mechanism of FIG. 6.

Further, the moving part 43 is provided with the plurality of balls 47a held at equi-angular interval with a ring unit 47 along the circular guideway 46 formed thereon. The ring unit 47 are designed to support the rotating part 44 and the breast frame 41 in the directions of thrust and radial by receiving the rotating part 44 attached to the bottom face of the breast frame 41 into its inner diameter part. Therefore, since the ring unit 47 configure ball bearings together with the guideway 46, the breast part 11a attached to the breast frame 41 is supported smoothly movably or rotationally with sufficient rigidity in both longitudinal and horizontal direction relative to the waist part 11b attached to the waist frame 42.

To wit, the breast frame 41 is fixed to an output axis 41b of a drive motor 41a with a fixing screw 48 through the moving part 43 with the rotating part 44 in a state of being received in the ring unit 47. Therefore, the breast frame 41 can easily be detached from the moving part 43 and the waist frame 42 by removing the fixing screw 48.

Figure 8:
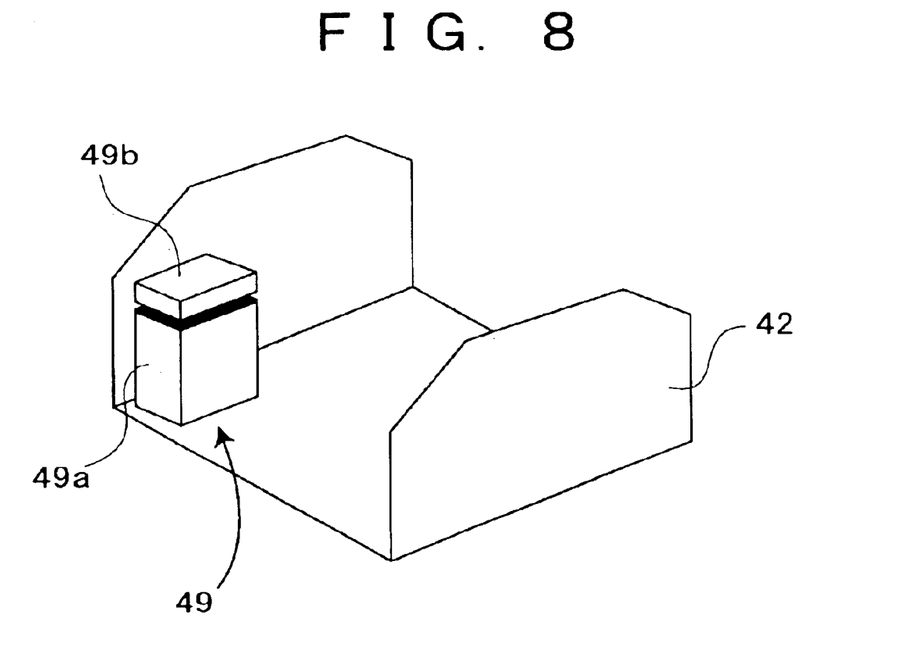
FIG. 8 is a schematic perspective view illustrating the setting of a sensor to the waist frame in a joint mechanism of FIG. 6.

Further, to the waist frame 42 as shown in FIG. 8, a sensor 49 to detect robot parameters, that is, triaxial orientation and acceleration, a triaxial gyrosensor 49a and triaxial acceleration sensor 49b in case of illustration, are provided. More preferably, said sensors 49a and 49b are configured as one module together with a microprocessors and others for measurement and signal processing, and are contained in the waist frame 42, that is, the waist part 11b, thereby wiring of cables can be simplified, for detection signals from the sensor are processed in said module.

Figure 9:
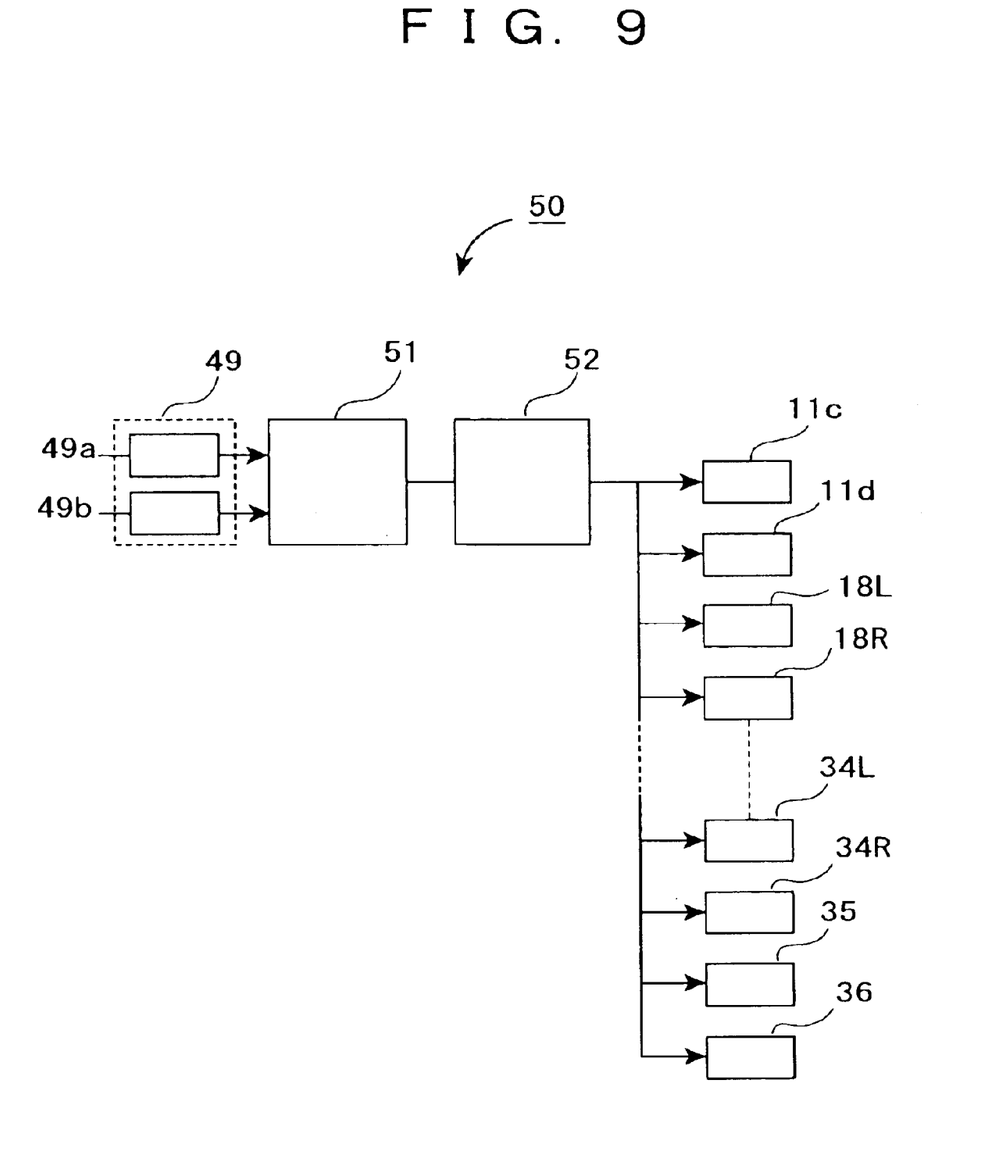
FIG. 9 is a block diagram illustrating the electrical makeup of the biped walking humanoid robot of FIG. 1.

FIG. 9 illustrates the electrical makeup of the biped walking humanoid robot 10 shown in FIG. 1 through FIG. 8. Referring to FIG. 9, the biped walking humanoid robot 10 is provided with a walk controller 50 to drive control the drive means, namely each joint part mentioned above, that is, the joint driving motor 11d, 11e, 18L, and 18R through 33L, and 33R.

The walk controller 50 is set inside the breast part 11a of the body part 11, is made up with a control part 51 and a motor control unit 52. The control part 51 is designed to produce control signals for each joint drive motor based on the pre-determined motion patterns. The direction relative to the waist part 11b attached to the waist frame 42.

To wit, the breast frame 41 is fixed to an output axis 41b of a drive motor 41a with a fixing screw 48 through the moving part 43 with the rotating part 44 in a state of being received in the ring unit 47. Therefore, the breast frame 41 can easily be detached from the moving part 43 and the waist frame 42 by removing the fixing screw 48.

Further, to the waist frame 42 as shown in FIG. 8, a sensor 49 to detect robot parameters, that is, triaxial orientation and acceleration, a triaxial gyrosensor 49a and triaxial acceleration sensor 49b in case of illustration, are provided. More preferably, said sensors 49a and 49b are configured as one module together with a microprocessors and others for measurement and signal processing, and are contained in the waist frame 42, that is, the waist part 11b, thereby wiring of cables can be simplified, for detection signals from the sensor are processed in said module.

FIG. 9 illustrates the electrical makeup of the biped walking humanoid robot 10 shown in FIG. 1 through FIG. 8. Referring to FIG. 9, the biped walking humanoid robot 10 is provided with a walk controller 50 to drive control the drive means, namely each joint part mentioned above, that is, the joint driving motor 11d, 11e, 18L, and 18R through 33L, and 33R.

The walk controller 50 is set inside the breast part 11a of the body part 11, is made up with a control part 51 and a motor control unit 52. The control part 51 is designed to produce control signals for each joint drive motor based on the pre-determined motion patterns. The motor control unit 52 is designed to drive control each joint drive motor in accordance with the control signals from the control part 51. Further, the control part 51 is designed to drive control joint drive motors by judging the current state (posture) of the robot, and mutually coordinating the motors corresponding to this state, based on the detection signals of the robot parameters from a sensor 49 set inside the waist frame 42 mentioned above, namely the triaxial gyro sensor 49a and triaxial acceleration sensor 49b.

The walk controller 50 and each joint drive motor are designed to act, supplied with power from a power source battery 53 as a power source. The power source battery 53 is, as shown in FIG. 1, set on the front side of the breast part 11a of the body part 11 of the biped walking humanoid robot 10. For example, the power source battery 53 is set inside the panel which is capable to be opened and closed, and is set on the front side of, for example, the breast part 11a, and is connected to a power source connector set inside, whereby power can be supplied from the power source battery 53 to the walk controller 50 and each joint drive motor, and it is also possible to change batteries easily by opening the panel for battery change.

The biped walking humanoid robot 10 according to an embodiment of the present invention is made up as described above, and the control part 51 of the walk controller 50 produces control signals for ordinary walk motion based on the pre-determined walk motion patterns, and outputs them to the motor control unit 51, whereby the motor control unit 52 drive controls the joint drive motors of the forward bending part 11c, and respective joint parts 18L, 18R, through 33L and 33R. Thus, the biped walking humanoid robot 10 is adapted to perform walking action.

Figure 10:
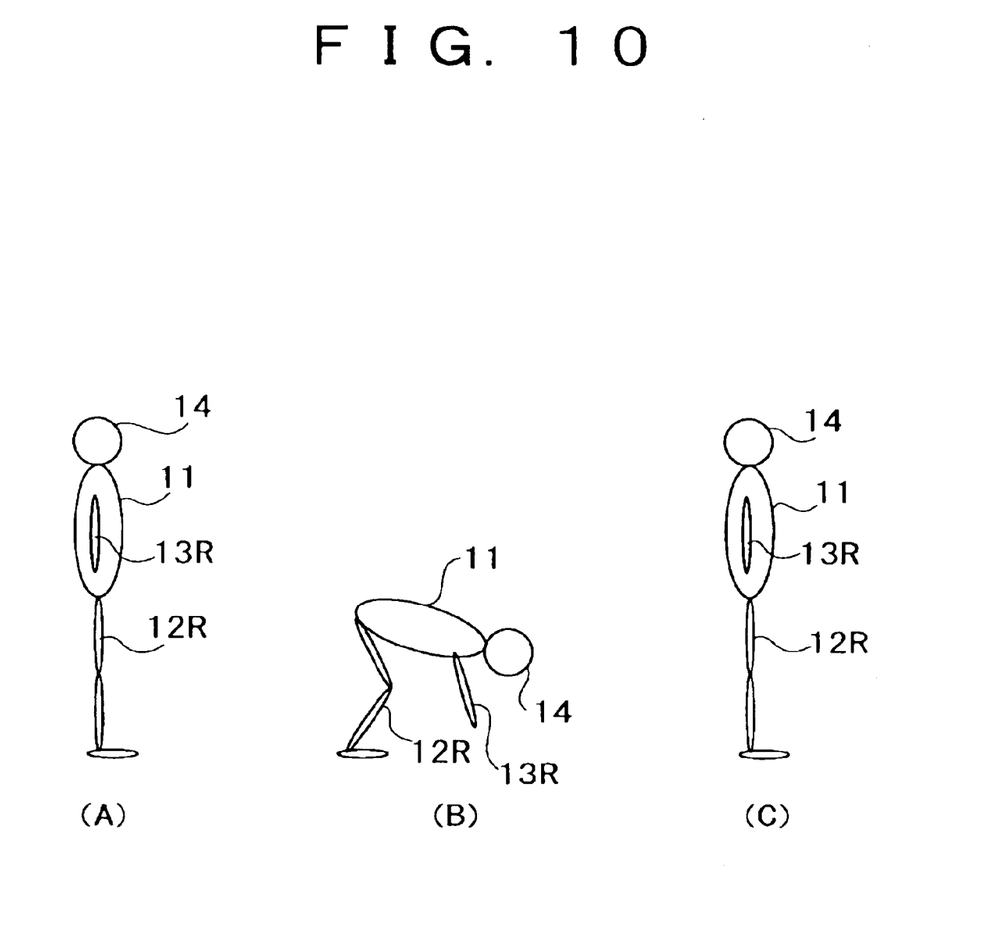
FIG. 10 is a left-side view illustrating the sequential motion of picking up an object of the biped walking humanoid robot of FIG. 1.

Here, in case that the biped walking humanoid robot 10 picks up, for example, an object lying in front, it does so by stooping forward and picking up the object as shown in FIG. 10(B) from erecting posture as shown in FIG. 10(A), and then returns again to erecting posture as shown in FIG. 10(C), by the control part 51 which drive controls the joint drive motors of respective joint parts of leg parts 12L and 12R, arm parts 13L and 13R, and the forward bending part 11c in mutual coordination.

Figure 11:
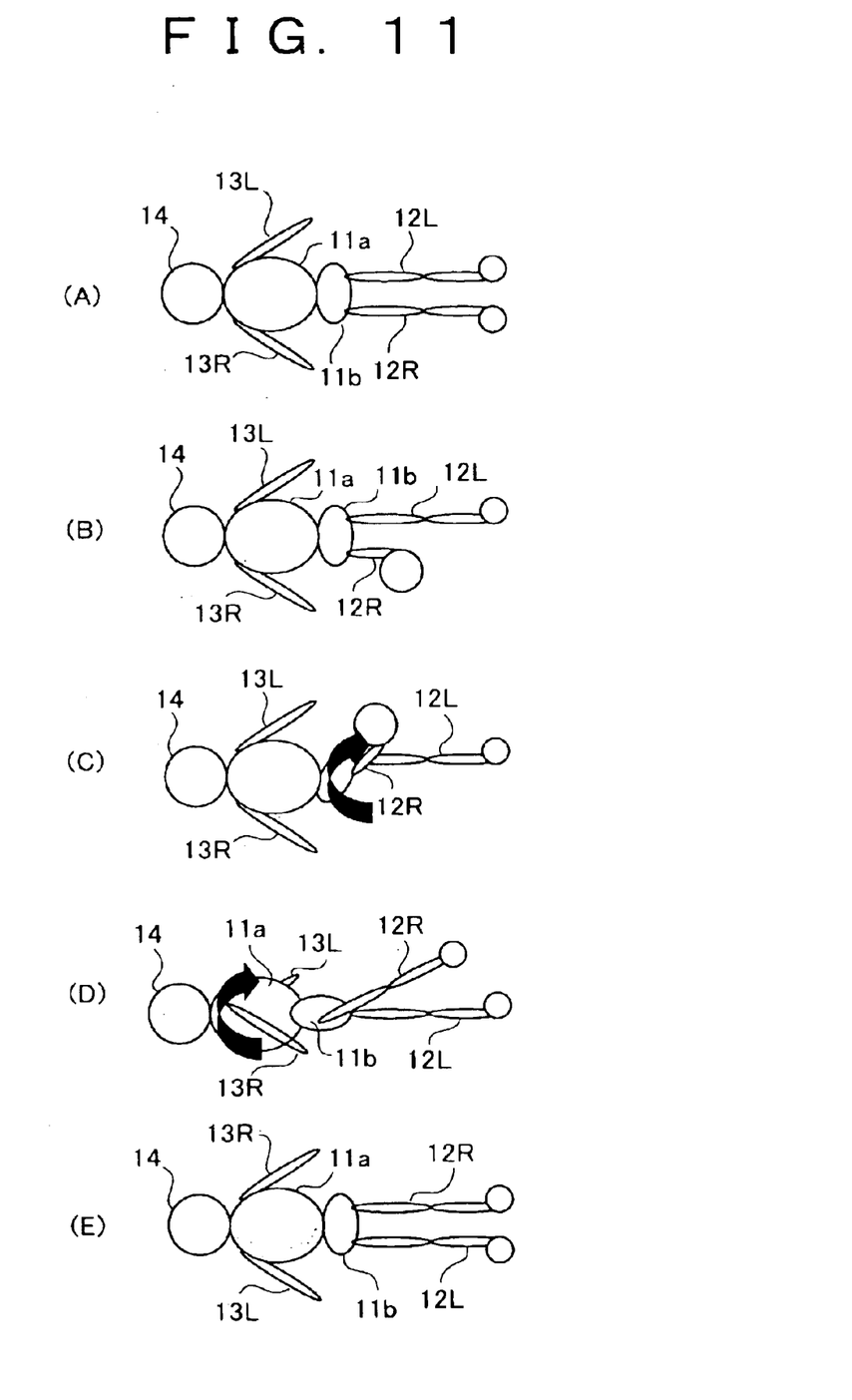
FIG. 11 is a plane view illustrating the sequential motion of rolling of the biped walking humanoid robot of FIG. 1.

On the other hand, in case that the biped walking humanoid robot 10 performs rolling over action, like the previous case, it raises the knee 21R of the right leg 12R as shown in FIG. 11(B) from a lying posture with its front upward as shown in FIG. 11(A), and then pushes out the right leg 12R to the left as shown in FIG. 11(C) by the control part 51 which drive controls the joint drive motors of respective joint parts of leg parts 12L and 12R, arm parts 13L and 13R, and the forward bending part 11c in mutual coordination. Further as shown in FIG. 11(D), the waist part 11b is rotated together with leg parts 12L and 12R, followed by the breast part 11a rotated while twisting the waist, then the whole body is in the posture of lying with its front down and the rolling over action is completed as shown in FIG. 11(E).

Figure 12:
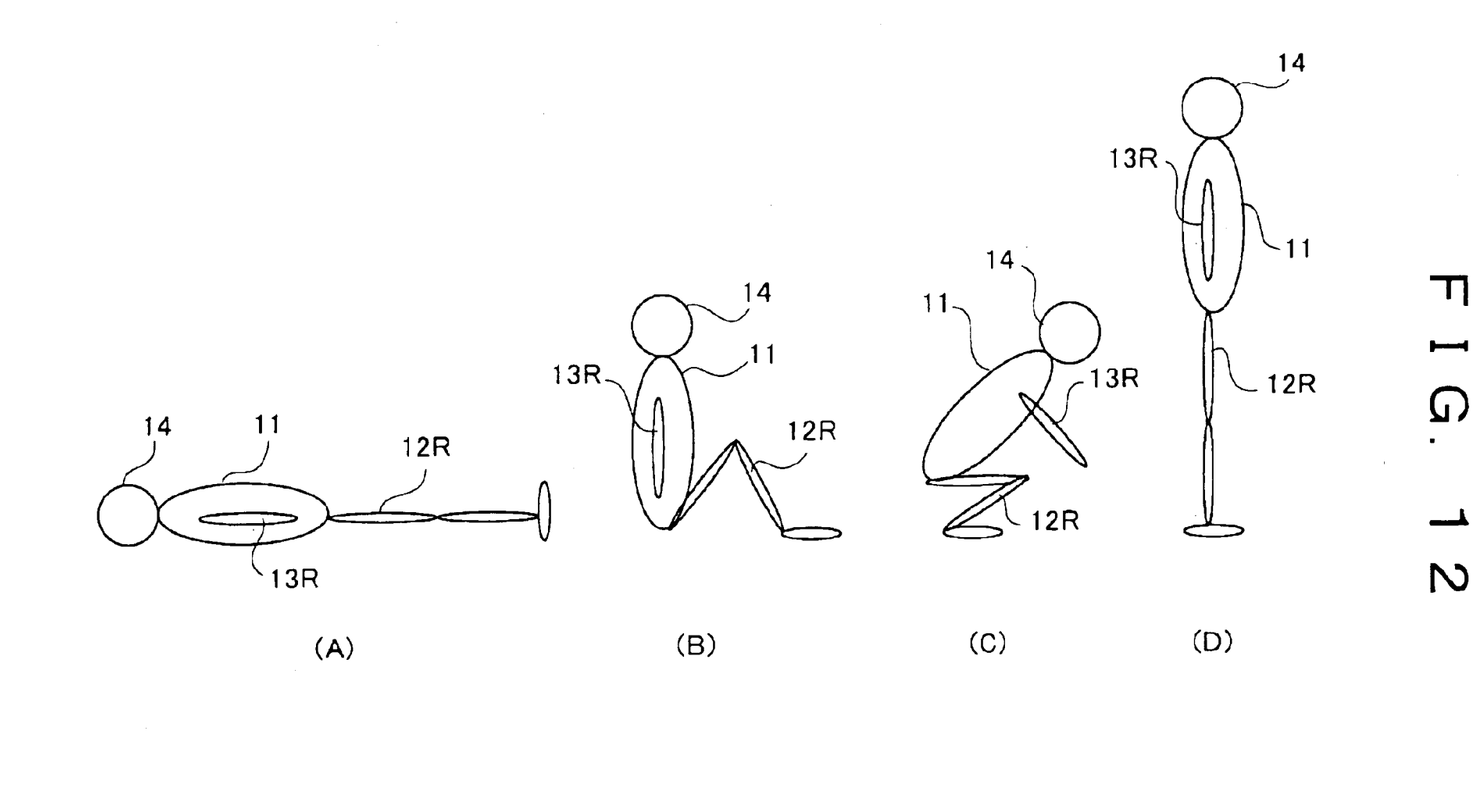
FIG. 12 is a left-side view illustrating the sequential motion of arising of the biped walking humanoid robot of FIG. 1.

Also, in case that the biped walking humanoid robot 10 performs arising action, like the previous case, while it pulls close knees 21L and 21R as shown in FIG. 12(B), it raises the breast part 11a and waist part 11b from a lying posture with its front upward as shown in FIG. 12(A), by the control part 51 which drive controls the joint drive motors of respective joint parts of leg parts 12L and 12R, arm parts 13L and 13R, and the forward bending part 11c in mutual coordination. Then it comes to crouching posture with both leg parts 17L and 17R pulled close as shown in FIG. 12(C), and finally standing action is completed by straightening both leg parts 12L and 12R while arm parts 13L and 13R and the breast part 11a taking balancing action.

Figure 13:
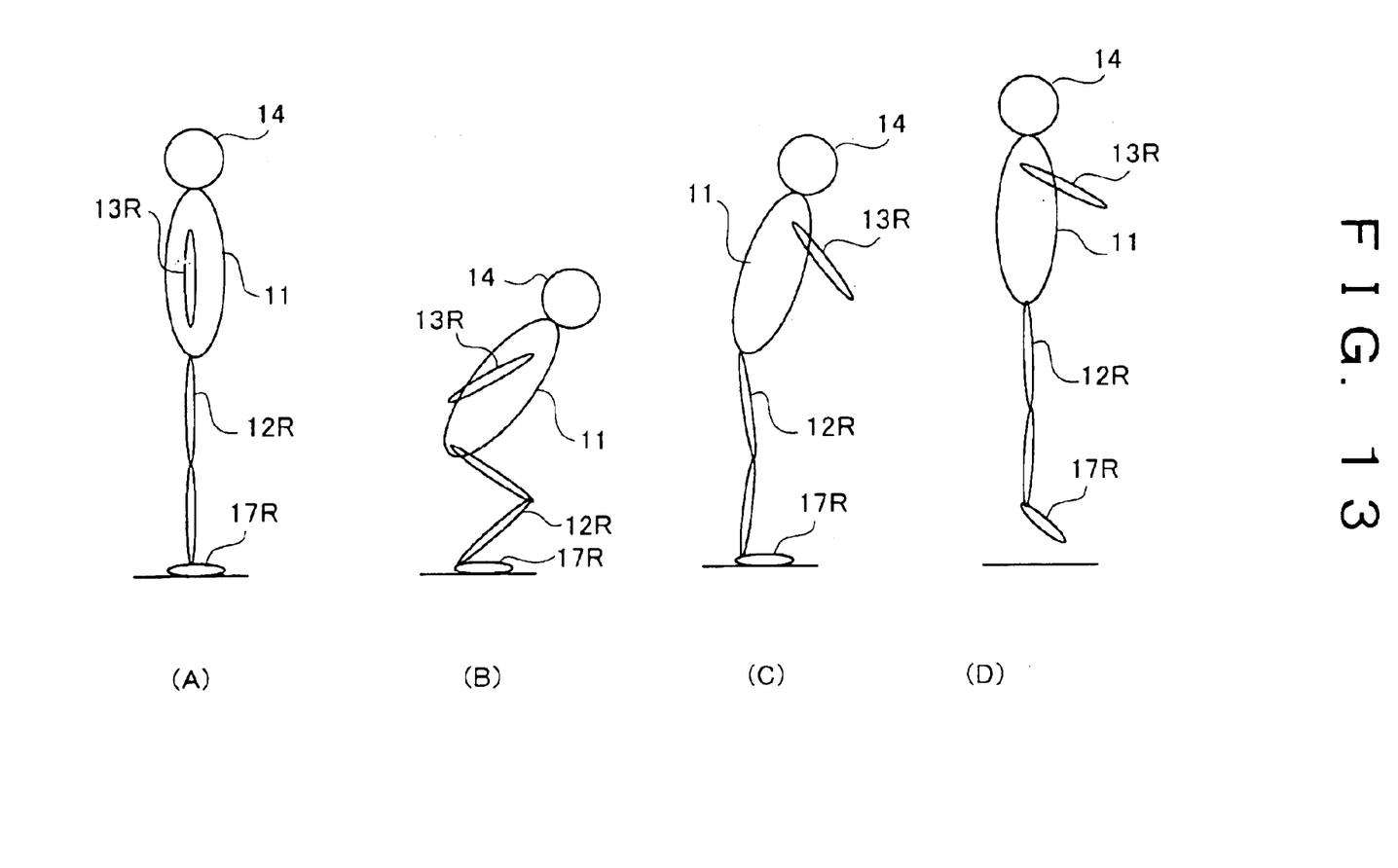
FIG. 13 is a view illustrating the sequential motion of jumping of the biped walking humanoid robot of FIG. 1.

Also, in case that the biped walking humanoid robot 10 performs jumping action, like the previous case, after it crouches bending knee parts 21L and 21R of both leg parts 12L and 12R as shown in FIG. 13(B) and pulls backward both arm parts 13L and 13R, from erecting posture as shown in FIG. 13(A) by the control part 51 which drive controls the joint drive motors of respective joint parts of leg parts 12L and 12R, arm parts 13L and 13R, and the forward bending part 11c in mutual coordination, it straightens both knee parts 21L and 21R, and both foot parts 17L and 17R, swings up forward both arm parts 13L and 13R, and by utilizing moment of inertia applied to the body part 11 by extension of knees 21L and 21R, stepping out of foot parts 17L and 17R, and swing up of both arm parts 13L and 13R whole robot 10 floats up with its leg parts 12L and 12R leaving from the floor as shown in FIG. 13(D), whereby jumping action is completed.

In this case, in order to perform jumping action more easily, it becomes important to balance the weights of respective parts of the humanoid robot 10. For jumping action, such weight balance is preferred, for example, as the upper body comprising the breast part 11a of the body part 11, and the head part 14 weighs half or more the whole weight of the robot 10, both leg parts 12L and 12R weigh less than one third, and both arm parts 13L and 13R weigh over one tenth. It becomes possible by this to have jumping action performed using a small torque motor as the joint drive motors of respective joint parts by utilizing above-mentioned moment of inertia applied to the body part 11 by extension of knees 21L and 21R, stepping out of foot parts 17L and 17R, and swing up of both arm parts 13L and 13R.

Thus, the biped walking humanoid robot 10 according to an embodiment of the present invention is made up as such, its body part 11 comprises the breast part 11a and the waist part 11b, the breast part 11a is biaxially movable and rotatable with respect to the waist part 11b, and its such full body movements as, for example, protective action when tumbling down, arising action or rolling action are assured to perform by the walk controller which drive controls joint drive motors of respective joint parts in mutual coordination. It also can perform jumping or balancing action by full body movement utilizing the weight and the moment of inertia of arm and a breast parts. Further, it can easily stoop forward, as a horizontal rotational axis supporting the breast part 11a is aligned in forward position, whereby the breast part 11a moves forward widely relative to the waist part 11b. Also, the breast part 11a is supported biaxially movably with sufficient rigidity relative to the waist part 11b, since the vertical axis supporting the breast part 11a is supported with the connection mechanism 40.

Further, since the sensor 49 is provided to the breast part 11b which moves less than the movable breast part 11a, leg parts 12L and 12R, and arm parts 13L and 13R, robot parameters can be accurately detected without being affected by the movements of these parts during movements including walking motion and other full body movements.

Since also the power source battery 53 is set on the front side of the breast part 11a, it does not prohibit full body movement of the robot while keeping the center of gravity of the robot high, and if the robot tumbles down forward, it can reduce the shock to the power source battery by extending its arms forward, and if it tumbles down backward, its arising motion is not prohibited by the weight of the power source battery.

According to the embodiment described above, leg parts 12L and 12R have six degrees of freedom, and arm parts 13L and 13R have five degrees of freedom, but this is not the restrictive condition, and they may have either less or more degrees of freedom.

INDUSTRIAL APPLICABILITY

According to the present invention as described above, a biped walking humanoid robot can, for performing full body movement, move inclusively the upper body comprising a breast and arm parts with respect to the lower body comprising a waist and leg parts by so-called stoop forward and waist twisting with a walk controller which drive controls respective drive means in mutual coordination, whereby moves the breast part biaxially, that is, longitudinally or rotates it horizontally with respect to a waist part. Thus, such full body movements as, for example, protective action when tumbling down, arising action, and rolling action can be assuredly performed.

In case that full body movement is performed by utilizing the weight and the moment of inertia of arm parts and the breast part with the walk controller driving said arm and the breast part, the walk controller not only drives each part by each drive means, but also moves or rotates arm parts and the breast part with respect to the waist part, whereby makes possible broader full body movement, for example, like jumping by utilizing the weight and the moment of inertia of the arm and the breast parts with respect to the waist part.

Further, by three dimensional compensation of movement utilizing the upper body, balancing motion can be performed by utilizing such weight and the moment of inertia of the arm and the breast parts.

Thus, according to the present invention, there is provided an extremely superb biped walking humanoid robot capable of easily performing full body movement.

What is claimed is:

1. A biped walking humanoid robot, comprising:

a body part, leg parts attached to the lower both sides of said body part, arm parts attached to the upper both sides of said body part, and a head part attached on top of said body part, wherein said leg parts include two thigh parts attached triaxially movably to said body part, lower thigh parts each of which attached monoaxially movably to each lower end of said thigh parts, and foot parts each of which attached biaxially movably to each lower end of said lower thigh parts, wherein said arm parts include two upper arm parts one end of which attached biaxially movably to said body part, lower arm parts each of which attached monoaxially movably to each other end of said upper arm parts, and hand parts each of which attached monoaxially movably to each of said lower arm parts, and wherein the robot further comprises a drive means for moving foot parts, lower thigh parts, and thigh parts of said leg parts, hand parts, lower arm parts, and upper arm parts of said arm parts, and a breast part, respectively, and a walk controller which drive controls each drive means, the robot being characterized in that:

said body part comprises a waist part below, said breast part above attached biaxially movably to said waist part via a connection mechanism, and a drive means to move biaxially said breast part, said connection mechanism is attached to said breast part, and comprises a breast frame provided with a rotatory part acting as a vertical rotation axis at the bottom end, a waist frame attached to said waist part, and a moving part connecting mutually said breast frame and said waist frame, said moving part is provided with the plurality of balls held by ring units at equi-angular interval along the guideway formed as circular at the upper surface, said ring units support said breast frame in the direction of radial and thrust by receiving into its inner diameter part said rotatory part attached to the bottom surface of said breast frame, said waist frame is provided with a horizontal rotation axis aligned at the forward position from the center, and said moving part is supported movably with respect to said horizontal rotation axis.

2. A biped walking humanoid robot according to claim 1, characterized in that said walk controller makes full body movement performed by driving said arm parts and said breast part, whereby utilizing the weight and the moment of inertia of said arm parts and said breast part.

3. A biped walking humanoid robot according to claim 1, characterized in that said rotatory part is attached detachably to a output axis of said drive means set on said moving part.

4. A biped walking humanoid robot according to claim 1, characterized in that said breast part is rotatable horizontally in the angle range of −45 to +45 degrees or more.

5. A biped walking humanoid robot according to claim 1, characterized in that, said breast part is bendable forward longitudinally in the angle range of −10 to +60 degrees or more, said thigh parts are movable longitudinally in the angle range of −45 to −60 degrees or more relative to said waist part, and said lower thigh parts are movable longitudinally in the angle range of −120 to 0 degrees or more relative to said thigh parts.

6. A biped walking humanoid robot according to claim 1, characterized in that a sensor to detect robot parameters is set on said waist part of said body part.

7. A biped walking humanoid robot according to claim 6, characterized in that said sensor is constituted with a gyrosensor.

8. A biped walking humanoid robot according to claim 6, characterized in that said sensor is constituted with a triaxial acceleration sensor.

9. A biped walking humanoid robot according to claim 6, characterized in that said sensor is constituted with a gyrosensor and a triaxial acceleration sensor.

10. A biped walking humanoid robot according to claim 6, characterized in that said sensor is constituted as a module together with circuit parts of microprocessors and others for measurement and signal processing of said sensor, and contained in said waist part.

11. A biped walking humanoid robot according to claim 1, characterized in that power source batteries to supply electricity to said each drive means and said walk controller and others are set in the front side of said breast part.

* * * * *